United States Patent [19]

Yung

[11] 4,150,674

[45] Apr. 24, 1979

[54] THREE-COMPONENT BLENDS OF A POLYAMIDE, AND A POLYESTER AND A LACTAM TERPOLYMER

[75] Inventor: Kai-Lim W. Yung, Raleigh, N.C.

[73] Assignee: Monsanto Company, St. Louis, Mo.

[21] Appl. No.: 864,881

[22] Filed: Dec. 27, 1977

[51] Int. Cl.² .............................................. C08L 77/00
[52] U.S. Cl. ............................ 428/288; 260/857 PE; 260/857 PG; 428/296; 428/373
[58] Field of Search ................... 260/857 PG, 857 PE; 428/288, 296, 373

[56] References Cited

U.S. PATENT DOCUMENTS

| | | | |
|---|---|---|---|
| 3,366,608 | 1/1968 | Lincoln | 260/78 L |
| 3,522,329 | 7/1970 | Okazaki | 260/857 PG |
| 3,862,262 | 1/1975 | Hedrick | 260/857 PG |
| 3,922,254 | 11/1975 | Hedrick | 260/857 PG |
| 3,925,325 | 12/1975 | Heimsch | 260/857 PG |
| 3,944,629 | 3/1976 | Hedrick | 260/857 PE |
| 3,965,075 | 6/1976 | Edwards | 260/857 PG |
| 3,993,709 | 11/1976 | Hedrick | 260/857 PE |
| 4,031,164 | 6/1977 | Hedrick | 260/857 PE |
| 4,034,015 | 7/1977 | Hedrick | 260/857 PE |

*Primary Examiner*—Paul Lieberman
*Attorney, Agent, or Firm*—Howard C. Stanley; Herman O. Bauermeister

[57] ABSTRACT

The production of compatible polymeric compositions, fibers and nonwoven webs from three-component blends of a polyamide, a polyester, and a terpolymer of lactam-polyolpolyacyl lactam or lactam-polyol-acyl-polylactam is described in the present patent application.

The products of this invention are characterized by having well balanced properties such as dimensional stability to moisture, moisture transport properties, antistatic and tensile properties. The compatible polymeric compositions of the invention are useful in general textile applications such as fibers, woven and nonwoven fabrics, apparel, carpeting, draperies and various industrial forms e.g. articles such as films.

11 Claims, No Drawings

THREE-COMPONENT BLENDS OF A POLYAMIDE, AND A POLYESTER AND A LACTAM TERPOLYMER

BACKGROUND OF THE INVENTION

DESCRIPTION OF THE PRIOR ART

Among the synthetic fibers produced on industrial scales at present, polyester fibers which is mainly composed of polyethylene terephthalate or polyamide fibers mainly composed of nylon 66 have received particularly wide acceptance, because of their excellent properties.

However, the polyester fibers have such drawbacks as poor dyeability, poor moisture transport and excessively high Young's modulus (initial modulus). A high initial modulus is objectionable in that it causes poor drapeability of the fabric prepared from the fibers.

The polyamide fibers, on the other hand, have a low initial modulus significantly lower than that of the polyester fibers, but the polyamide is moisture sensitive which results in poor dimentional stability to moisture.

Furthermore, a common and important drawback in the two fibers is that they are apt to accumulate electrostatic charge. If the hygroscopicity of both fibers could be enhanced, it would be possible to produce anti-static fabrics having increased comfort characteristics.

The lactam terpolymer used in this invention e.g. a lactam-polyol-polyacyl lactam or acyl polylactam, has good antistatic properties and good moisture transport properties, but it would be desirable to provide for improved dimensional stability to moisture.

Accordingly, it is apparent that if a polymer composition could be provided which is free from the foregoing drawbacks, interalia, the static charge accumulation, while retaining the excellent properties of the polyester and polyamide, the shaped articles prepared therefrom such as fibers and films will have very high commercial value.

Therefore, the object of this invention is to provide a resinous composition which gives the novel shaped articles including fibers having the above-described desirable characteristics, as well as a process for the preparation of such shaped articles from the composition.

Since polyesters and polyamides are chemically incompatible, it has not been possible in the past to create melt blends of a polyester and a polyamide having the abovedescribed desirable properties or to use them in fiber or fabrics such as non-woven fabrics.

The three component blends of this invention can be accomplished by any of the following methods.

1. The three polymer chips are well mixed and the mixture is converted into fibrous or shaped articles according to the accepted practice, using a conventional melt-spinning or molding machine.
2. The polymers are separately melted, and blended in the molten state.
3. A solid mixture of the three polymers is melt blended in a conventional extruder to form chips or pellets, which are then converted into fibrous or shaped articles by means of a conventional melt-spinning or molding machine.

The composition of this invention can be converted into filaments and staple by melt-spinning. It is also possible to use the composition as a component of composite fibers.

SUMMARY OF THE INVENTION

This invention relates to new products and processes based upon the production and use of polymeric compositions which are compatible three-component blends of polyester, polyamide and a terpolymer of lactam-polyol-polyacyl lactam or lactam-polyol-acyl polylactam. The above third component is herein called a lactam terpolymer. Since polyesters and polyamides are chemically incompatible, useful products from the polymeric blends of polyesters with polyamides cannot be obtained. However it has now been found that specific proportions of polyesters and polyamides when combined with certain proportions of lactam terpolymers as defined herein permit the production of useful blended products such as fibers, non-woven fabrics, fibers etc.

The present products have unusually well balanced anti-static and other properties such as dimensional stabilities to moisture, moisture transport properties, and tensile properties. The proportions of the three-components of the present polymeric system are 5–90 wt. % of each component. Preferred ranges are 15–80 wt. % polyester, 15–80 wt. % of the polyamide and 10–40 wt. % of the lactam terpolymer.

In order to prepare the desired polymeric compositions, the components are melt blended such as by grinding the individual polymers, and melting the fine powder or pellets or particles such as by charging the individual components to an extruder in which the components are melted in the screw of the extruder before being passed to a forming area such as a spinning area or a film forming area, or an injection molding area. A preferred embodiment is the spinning of the aforesaid three-component polymer into fibers. These fibers are highly useful per se and may be processed by conventional means such as texturizing and ultimately woven into fabrics. The fabrics have highly desirable anti-static properties, moisture transport properties, dimensional stability to moisture as well as tensile properties so that they are useful for a variety of fabric applications such as the manufacture of clothing, drapes and carpeting.

A highly useful field of application, and a part of the present invention, is the production of nonwoven fabrics from a web of the fibers formed from melt spinning and extrusion of the three component polymeric system. The web of the nonwoven fabric is then passed through a heating, and if desired, a pressure zone for the bonding of the fibers into a consolidated nonwoven fabric. The temperature employed in the bonding step is from 100° C. to 250° C. a preferred range being from 200° C. to 250° C.

The formation of a nonwoven fabric from the discrete fibers is conducted by calandering the fibers as a web between heated rolls, e.g. hot calandering. This may be carried out with a plain roll and a roll with a patterned surface. An appropriately patterned roll can be used to produce any desired pattern of heavy or primary bonded segments where the nonwoven fabric is nipped between the rolls during calandering. If desired, both rolls may also be patterned to provide a desired design. After the web has been bonded as described above, a subsequent annealing or heat setting step is conducted, if desired, on the bonded fabric, facilitating normal crystallization and thus producing a fabric which is stable at high temperature conditions. The conventional step of heat setting on a tenter frame can also be applied to the bonded fabrics to provide good dimensional stability.

Annealing is carried out at a temperature from 10° C. to 100° C. above the bonding temperature. Annealing is the process by which a polymeric substance in a shaped form, such as synthetic fibers is brought to its equilibrium morphological state. It normally involves heating the polymeric substance either in a stressed or relaxed state to a temperature between the glass transition and melting temperatures. Annealing is desirable because it accelerates the rate of crystallization and/or improves the degree of crystallinity. After annealing, the polymeric substance has an improved balance of physical properties.

In this way a nonwoven fabric may be obtained which has unusually good antistatic properties and also good moisture transport, dimensional stability to moisture, and tensile properties.

Some of the advantages of the invention are (1) the said three component melt blends possess the desirable properties of each of the three constituents: the polyamide, the polyester, and the lactam terpolymer. Articles made of the said three component blends are as durable and tough as polyamide, as stable to moisture and as easy to care for as polyester, and as anti-static as the lactam terpolymer, and with good moisture transport; (2) the process of the invention makes possible the engineering of properties of the resultant articles to meet the specific needs of a particular application, by selecting the composition of the melt blend components.

Polyamides as employed herein comprise the self-polymerization products of monoaminomonocarboxylic acids, or from the polymerization of a diamino hydrocarbon and a dicarboxylic acid. These polyamides can be obtained by the methods given in U.S. Pat. Nos. 2,241,322 or 2,071,250 or 2,071,253 or 2,130,948 and by other methods. The polyamides are of two types; those derived by self-polymerization of a monoaminomonocarboxylic acid, or by self-polymerization of a cyclic amide, or their amide forming derivatives, and those derived from suitable diamines by reaction with suitable dicarboxylic acids or the amide-forming derivatives of those acids. The most widely used polyamide is hexamethylene adipamide, called nylon 66.

The polyesters of the present invention are prepared by heating together dihydric alcohols or functional derivatives thereof and dibasic carboxylic acids or polyester-forming derivatives thereof such as acid halides, salts, or simple esters of volatile alcohols. Highly polymerized polyesters can be formed into filaments, fibers, films and the like which can be permanently oriented. The most widely known and most important commercially of the polymeric polyesters are that prepared by the condensation of terephthalic acid or dimethyl terephthalate and ethylene glycol or butylene glycol. Carboxylic acids or polyester-forming derivatives thereof may be employed to make polyesters but more preferably are aromatic dibasic dicarboxylic acids or dialkyl esters thereof. Of particular value is terephthalic acid and dialkyl esters thereof such as dimethyl terephthalate and similar dialkyl esters wherein the alkyl groups are the same or different alkyl radicals, preferably alkyl hydrocrbon radicals containing 1 to 5 carbon atoms thereof. Isophthalic acid and its dialkyl esters also may be employed to make the modified polyesters of this invention. Other useful aromatic dicarboxylic acids or esters thereof which may be used include p,p'-dicarboxy diphenyl, naphthalene dicarboxylic acids such as 2,6-dicarboxy naphthalene; p,p'-dicarboxy diphenylsulfone, p,p'-dicarboxyphenoxyethane and the like. Aliphatic dicarboxylic acids such as adipic, succinic, sebacic and the like may be substituted in part for the aryl dicarboxylic acids.

The third component of the present three-component blends is a lactam terpolymer or more specifically a terpolymer of lactam-polyol-polyacyl lactam or lactam polyol-acyl-polylactam, as discussed in U.S. Pat. No. 3,862,262.

These terpolymers can be additionally characterized as having ester, amide, and/or hydroxy end group termination, as well as both ester linkages and amide linkages between monomeric segments thereof. The terpolymers may be prepared by an anionic catalyzed polymerization with a polymer initiator and the terpolymers are formed with dicarboxylic acid esters and aliphatic polyols and/or aliphatic polyether polyols; as well as through a process comprised of polymerizing together lactams, polyols and polyacyl or acyl polylactams and an alcohol in the presence of a base lactam polymerization catalyst.

The lactam terpolymer as described below is based upon various moieties as components of a block terpolymer. For example, in the embodiment of the lactam-polyol-polyacyl lactam terpolymer, the lactam may be caprolactam, the polyol may be 1,4-butanediol or polyethylene glycol, and the polyacyl lactam may be tetraphthaloyl biscaprolactam or 1,3-benzene disulfonyl caprolactam.

A preferred monomer of the terpolymer is ε-caprolactam. Lactam monomers in addition to ε-caprolactam include alphapyrrolidinone, piperidone, valerolactam, caprolactams other than the ε-isomer, capryllactam, lauryllactam and the like. In addition to lactams unsubstituted on their carbon chains, lactams having substituents on the carbon chain which do not inhibit or otherwise adversely affect the polymerization of the lactam are also included within the scope of this invention.

During polymerization the cyclic lactam ring is opened to provide the following monomeric unit

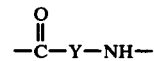

which, together with other lactam molecules, produces a polymeric block of the formula

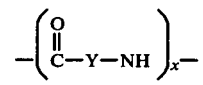

where x is an integer greater than one. The monomeric lactam unit can also react with the polyacyl alkoxide. Similarly, a polylactam block, when joined with a polyacyl unit forms a polymer segment of the formula

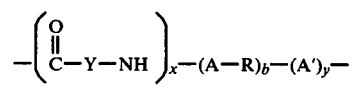

where R is a hydrocarbon group described hereinbelow, A and A' are acyl groups, x is an integer greater than one, y is an integer equal to or greater than one, and b is an integer equal to zero or one.

In the course of the polymerization of the components described above, a polyol can react with the polymerizable lactam unit or block to produce a polymer segment of the formula

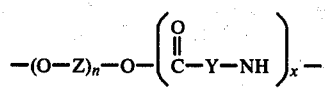

where x and n are integers equal to at least one and where Z is a hydrocarbon, substituted hydrocarbon or acylated hydrocarbon group which, together with the oxygen atom attached thereto, forms a polyether or polyester segment of a polymer molecule. The Z hydrocarbon, substituted hydrocarbon and acylated hydrocarbon groups can be of any size even polymeric such as polybutadiene, generally limited to about six carbon atoms, said groups being preferably alkylene, arylene, alkylene carbonyl, arylene carbonyl, and mixtures thereof. Even more preferred are unsubstituted aliphatic groups such as methylene, ethylene, propylene, butylene and the like. Other suitable Z groups include phenylene, chlorophenylene, tolylene, isobutylene, isopropylene, ethylcarbonyl, propylcarbonyl, ethylsulfonyl, propylthiocarbonyl and the like.

The preference indicated above for unsubstituted aliphatic Z groups means that terpolymers of this invention which contain polyether segments are preferred over other embodiments which contain polyester segments.

In preferred aspects of this invention, it is theorized that the lactam is present in the polymer in the form of polylactam blocks which are alternated with blocks of polyol and polyol segments to form the polymer. The polylactam blocks when present can be of any size but customarily have molecular weights of at least about 500, preferably at least about 1000.

The polymerized polyol components of the polymers of this invention are formed from polyol intermediates having at least two hydroxy groups. Available commerical polyols of this class are produced by reacting, for example, propylene oxide or ethylene oxide with glycols, glycerol, pentaerythritol, glucose, amines, and the like. Included within the scope of the above class are a large number of suitable compounds ranging from the simple diols such as ethylene glycol to complex polymeric polyols such as poly (ε-caprolactone) diol. Other polyol compounds include alkylene glycols such as diethylene glycol, triethylene glycol, tetraethylene glycol, tetramethylene glycol, propylene glycol, dipropylene glycol, hexylene glycol, 1,2-propanediol, 1,3-propanediol, 1,3-hexanediol, 1,5-pentanediol, butylene glycol, 1,4-butanediol, dicyclopentadiene glycol, heptaethylene glycol and isopropylidene bis (p-phenyleneoxypropanol-2); diols other than akylene glycols such as pyrocatechol, resorcinol, hydroquinone, hydroxyethyl acrylate and hydroxypropyl methacrylate; polyols having more than two hydroxy functions such as glycerol, pentaerythritol, 1,2,6-hexanetriol, 1-trimethylol propane, pyrogallol and phloroglucinol; polymeric polyols such as polyethylene glycols, polypropylene glycols, polyoxypropylene diols and triols, castor oils, polybutadiene glycols and polyester glycols, and a large number of compounds containing substituents other than hydroxy groups such as 2,4-dichlorobutylene glycol and 2,2'-4,4' bis (chlorohydroxyO phenyl) ether. In addition to all the hydroxy compounds set forth above, the thio compounds analogous to the above compounds having sulfur atoms in place of oxygen are also included within the scope of the invention. A few examples include hydroxyethyl thioglycolate, ethylene glycol bis(thioglycolate), pentaerythritol tetrakis-(thioglycolate) and thiodiglycol.

If the polyol intermediate is a polymer, the molecular weight of the polyol can be any amount. Commercially available polymeric polyol compounds have molecular weights from 200 to 5000, but polymers with molecular weights outside that range are also useful in the practice of the instant invention. If the polyol intermediate or segment is a single molecule having at least two hydroxy groups such as ethylene glycol, a suitable polyol segment according to the invention would have a molecular weight of at least 62.

The third component of the terpolymers has the following structural configuration in the polymer chain:

where R is a hydrocarbon group, A and A' are acyl radicals, y is an integer equal to at least one, and b is an integer equal to zero or one.

The R group can be any hydrocarbon group having at least two valence bonds for attachment to the acyl groups shown in the above formula. Examples include functional groups obtained by the removal of hydrogen atoms from methane, ethane, propane, hexane, dodecane, benzene, toluene, cyclohexane and the like. The polyvalent R group can be of any size but is preferably limited to about twenty carbon atoms, and more preferably about eight carbon atoms. If the integer "y" is one, the linkage will be a diacyl group. The A group can be any acyl group and preferably are

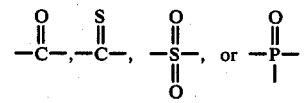

groups. Most preferred among the above groups is the carbonyl group.

Values for the integer "y" have a direct relationship to the thermoplasticity of the terpolymer. If the integer "y" is greater than one, the linkage will be a higher polyacyl. The higher the value of "y", the more highly crosslinked will be the finished polymer. Values for "y" can be as high as six or eight, but more preferably do not exceed two or three.

The polymerized product comprising the aforementioned components can have a number of different structures depending upon the process conditions and the relative proportions of ingredients used in the reaction system. Polymers can be prepered having relatively small segments of lactam units joined to similarly short segments of polyol units through the polyacyl linkage described above. Or large segments of one polymeric component can be combined with a larger number of comparatively small segments of another polymeric unit, which small segments are joined to one another through the polyacyl linkage as well as to the other type of polymeric component. Or segments of varying sizes of both the lactam and the polyol polymeric units can be combined through the polyacyl components to form a highly random terpolymer. Another form of polymer within the scope of this invention are block polymers, where moderately large size blocks or segments of the lactam and polyol polymeric units are positioned alternately in the polymer chain and joined through the polyacyl group described above. If the polyacyl linkages are, for purposes of simplification, considered to be a part of either a lactam or polyol block, then the block polymers of this invention can be discussed in terms of two alternating blocks designated as A and B blocks, instead of in terms of complicated patterns of three blocks designated as A, B and C blocks. Block polymers prepared according to this invention can have three general structural configurations, AB, ABA and a repeating pattern of AB segments. Following a general characterization of a block copolymer prepared within the scope of this invention as AB, ABA or repeating AB, it should be recognized that the exact structural configuration may vary somewhat from the general characterization of the polymer. As an illustration, one theoretical formula for a lactam-polyol-polyacyl lactam block terpolymer of the repeating AB type could be

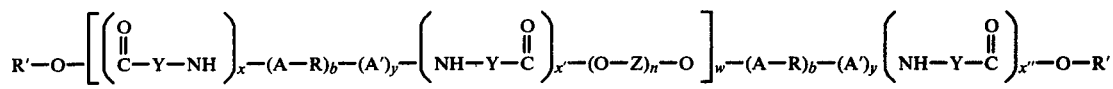

where y, x, x', x", n and w are all integers equal to one or more; b is an integer equal to zero or one; R is a divalent or polyvalent hydrocarbon group; (O-Z)$_n$ is a polyol segment or a polymeric moiety and Z is a hydrocarbon or substituted hydrocarbon group; Y is an alkylene group having at least three carbon atoms; A and A' are acyl groups; and R' is an aliphatic or substituted aliphatic hydrocarbon wherein the ester group is attached to other than an aromatic radical. If for instance Y is a straight chained alkylene group, A and A' are carbonyl groups, Z is ethylene, —CH$_2$CH$_2$—, and R is phenylene, the terpolymer would be a caprolactam-ethylene glycol polymer where the caprolactam segments of the polymer are joined to one another and to the ethylene glycol segments through terephthaloyl linkages. Other lactam-polyol polymers, both of the AB, ABA as well as the repeating AB type, will become immediately apparent to those skilled in the art in view of this disclosure. It should therefore be noted that the above structural formula is set forth for illustrative purpose only, and is not intended as a limitation of the polymers within the scope of the invention.

When the polymers of this invention are of the ABA type, where one block of one type of polymer segment is located between two blocks of the other type of polymer segment, the polymers can be of either the polyol-lactam-polyol type or the lactam-polyol-lactam type. Of the two types, the latter is a preferred type of ABA polymer.

If the lactam-polyol-polyacyl lactam polymer is a block polymer, the polyol blocks can, like the polylactam blocks, be of any size but customarily have molecular weights of at least about 500, preferably at least about 1000. The ratio of the number of lactam to polyol blocks can also vary. Since the block polymers can be of either the type designated as AB, ABA or repeating AB, the ratio of lactam blocks to polyol blocks can vary from 2:1 to 1:1 to 1:2. Mixtures of two or more block polymers having different ratios of the lactam and polyol blocks will produce ratios of polymer blocks intermediate between the above stated ratios.

In the above theoretical formula for a lactam-polyol block terpolymer, the polyacyl linkage is represented as located between two lactam polymer segments as well as between a polyether segment and a lactam polymer segment. As a practical matter, the polyacyl linkages will also be located occasionally between two polyol blocks. It should be noted, moreover, that the polyacyl linkages need not invariably be positioned between lactam and polyol blocks since the necessary linkage can be provided in the form of an ester linkage by the oxygen atom of the polyether segment and the carbonyl group of a polylactam segment.

Following is a general characterization of the lactam polyol-polyacyl lactam terpolymer produced according to the invention. As an illustration, the lactam-polyol-polyacyl lactam or acyl polylactam terpolymer has the general formula:

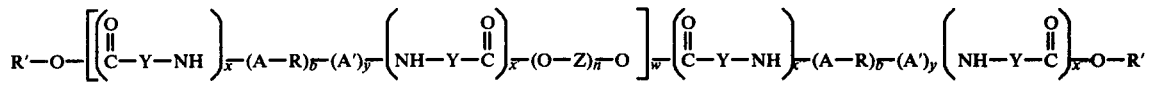

Wherein (O-Z)$_n$ is a polyol segment or a polymeric moiety and Z is a hydrocarbon or substituted hydrocarbon group said group being alkylene, arylene, alkylene carbonyl, arylene carbonyl, and mixtures thereof; A and A' are acyl groups selected from

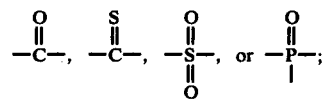

R is a polyvalent hydrocarbon group;
Y is an alkylene or substituted alkylene having from about 3 to about 14 carbon atoms;
y is an integer equal to at least one, and
b is an integer equal to zero or one;
x, x', x" and x'" are integers and the total number of x's is equal to 2w+2; and
n and w are integers equal to one or more.

Wherein (O-Z)$_n$ is a polyol segment or a polymeric moiety and Z is a hydrocarbon or substituted hydrocarbon group said group being alkylene, arylene, alkylene carbonyl, arylene carbonyl, and mixtures thereof; A and A' are acyl groups selected from

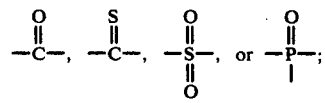

R is a polyvalent hydrocarbon group;
Y is an alkylene or substituted alkylene having from about 3 to about 14 carbon atoms;
y is an integer equal to at least one, and
b is an integer equal to zero or one;
x, x' x" and x'" are integers and the total number of x's is equal to 2w+2; and
n and w are integers equal to one or more.

DETAILED DESCRIPTION OF THE PREFERRED EMBODIMENTS OF THE INVENTION

The following examples illustrate specific embodiments of the present invention.

Melt blended fibers of the invention of various compositions as indicated in the table are prepared by (1) grinding each polymer component into sizes ranging from 10 to 20 mesh, (2) mixing these components together in the desired proportions, (3) melt blending these components together in a screw extruder having a three-quarter inch diameter screw and a length to diameter ratio of 20 to 1 at temperatures of 275° to 285° C., (4) forming the fibers with a spinneret having the specifications as given in the table; and (5) drawing these fibers to the maximum draw ratio on a pair of Godets.

The polyester used in these examples is polyethylene terephthalate, the polyamide used is hexamethylene adipamide, commonly called nylon 66, and the lactam terpolymer used contains 30% by weight of polyol.

The table below shows the anti-static and other physical properties of the three-component melt blended fibers.

| | FIBERS OF THE MELT BLENDS OF POLYETHYLENE TEREPHTHALATE, POLYAMIDE AND LACTAM TERPOLYMERS | | | | | | | | | | |
|---|---|---|---|---|---|---|---|---|---|---|---|
| | EXAMPLE | 1 | 2 | 3 | 4 | 5 | 6 | 7 | 8 | 9 | 10 |
| | % PET | 75 | 60 | 60 | 50 | 50 | 40 | 30 | 20 | 20 | 100 |
| | nylon 66 | 15 | 20 | 30 | 30 | 40 | 40 | 60 | 60 | 70 | 0 |
| | lactam terpolymer | 10 | 20 | 10 | 20 | 10 | 20 | 10 | 20 | 10 | 0 |
| Spinning Conditions | Temperature ° C. | 285 | 275 | 280 | 275 | 275 | 275 | 280 | 275 | 275 | |
| | Spinnerett (No. holes and diameter depth in mils) | 6×9 ×12 | 6×9 ×12 | 10×9 ×12 | 6×9 ×12 | 10×9 ×12 | 6×9 ×12 | 10×9 ×12 | 6×9 ×12 | 10×9 ×36 | |
| Static Properties | Initial Charge (MV) | 417 | 840 | 1250 | 220 | 870 | 1083 | 1070 | 920 | 1210 | 1320 |
| | Half Life (sec) | 9 | 4 | 4.3 | 2 | — | 4.3 | — | 4.6 | 8 | >44 |
| | Charge Retention (MV) | 67 | 80 | 135 | 0 | 317 | 63 | 630 | 83 | 190 | 1200 |
| | Surface Resistivity (ohm/sq.) | $1.5 \times 10^{12}$ | $5.0 \times 10^{12}$ | $4.8 \times 10^{12}$ | $1.7 \times 10^{10}$ | $9.0 \times 10^{12}$ | $8.8 \times 10^{11}$ | $1.5 \times 10^{14}$ | $8.5 \times 10^{11}$ | $5.5 \times 10^{12}$ | |

| | FIBERS OF THE MELT BLENDS OF POLYETHYLENE TEREPHTHALATE, POLYAMIDE AND LACTAM TERPOLYMERS | | | | | | | | | | |
|---|---|---|---|---|---|---|---|---|---|---|---|
| | EXAMPLES | | 1 | 2 | 3 | 4 | 5 | 6 | 7 | 8 | 9 | 10 |
| Fiber Tensiles | Denier | Dry | 11.1 | 17.5 | 80.0 | 11.8 | 9.1 | 33.2 | 26.8 | 9.5 | 11.0 | |
| | | Wet | 9.6 | 15.5 | 80.0 | 10.0 | 11.0 | 35.2 | 24.8 | 9.7 | 9.6 | |
| | Breaking Strength (gm) | Dry | 40.0 | 51.6 | 108.2 | 48.4 | 15.4 | 78.8 | 115.7 | 30.4 | 42.0 | |
| | | Wet | 38.4 | 50.7 | 94.7 | 35.0 | 13.4 | 84.9 | 98.0 | 31.9 | 35.9 | |
| | Tenacity (gm/d) | Dry | 3.6 | 3.0 | 1.4 | 4.1 | 2.0 | 2.5 | 4.3 | 3.3 | 3.9 | 4.2 |
| | | Wet | 4.0 | 3.4 | 1.2 | 3.5 | 1.3 | 2.5 | 4.0 | 3.4 | 3.8 | |
| | Elongation (%) | Dry | 39.6 | 94.5 | 682.8 | 57.6 | 190.4 | 150.8 | 63.8 | 73.2 | 86.3 | 17.8 |
| | | Wet | 646.4 | 99.0 | 646.6 | 50.8 | 201.3 | 175.9 | 60.5 | 81.0 | 62.7 | |
| | Modulus (gm/d) | Dry | 44.9 | 31.8 | 11.6 | 9.4 | 16.8 | 17.9 | 32.4 | 18.4 | 23.3 | 99.0 |
| | | Wet | 54.7 | 25.5 | 10.4 | 4.4 | 9.5 | 14.8 | 18.7 | 13.7 | 14.0 | |
| | Rupture Energy (g/min) | Dry | 3.5 | 5.2 | 4.6 | 4.0 | 3.9 | 6.3 | 5.3 | 4.5 | 6.2 | |
| | | Wet | 3.4 | 5.9 | 2.8 | 2.4 | 1.3 | 4.8 | 4.1 | 5.0 | 4.7 | |
| | Elastic Recovery at 5% ext.(%) | Dry | 84.2 | 78.9 | 79.4 | 85.3 | 83.4 | 80.3 | 86.6 | 84.4 | 81.1 | |
| | Permanent Set(%) | Dry | 3.5 | 11.1 | 13.3 | 5.1 | 7.6 | 10.0 | 5.9 | 5.7 | 8.8 | |

| | FIBERS OF THE MELT BLENDS OF POLYETHYLENE TEREPHTHALATE, POLYAMIDE AND LACTAM TERPOLYMERS | | | | | | | | | |
|---|---|---|---|---|---|---|---|---|---|---|
| | EXAMPLES | 1 | 2 | 3 | 4 | 5 | 6 | 7 | 8 | 9 |
| Dimensional* Stability | Wet Growth in Boiling Water (%) | +3.6 | +2.3 | +1.3 | +4.9 | +3.2 | +2.0 | +2.7 | +2.4 | +2.9 |
| | Irreversible Change Upon Drying (%) | +3.0 | +1.6 | −0.3 | +0.2 | +1.6 | +0.1 | +0.1 | +0.3 | +0.6 |

(+→Growth; −→Shrinkage)
*Before the boiling water growth test, the fibers were first annealed in a relaxed stage in boiling water.

From this table, one can see that these fibers have very good anti-static, moisture stability and tensile properties. In addition, fibers using polybutylene terephthalate instead of polyethylene terephthalate give equivalent properties. Nonwoven fabrics are readily made from these fibers by thermally bonding the webs of fibers in a calandering operation. The thus formed fabrics exhibit similarly the well balanced properties as their constituent fibers.

Another embodiment of the invention is the use of the three component melt-blends of the polyamide polyester and the lactam terpolymers with another polymer component to form composite articles such as side by side bicomponent, or sheath core fibers, e.g. with the said melt blend as the sheath, and the other polymer component as the core (or the opposite configuration). The said melt blend used for the aforesaid purpose contains from 5 to 90 wt. % of each component, and is used in the proportion of at least 5% by weight in the composite article. Polymers such as polyamides e.g. nylon 66, polyesters e.g. polyethylene terephthalate, or other polymer melt blends, etc. can be physically combined with the said melt blend of polyamide, and polyester lactam terpolymer to form the composite articles. If desired, additives such as flame retardant agents, e.g. tri(2,3 dibromopropyl) phosphate can also be employed in either of the physical components of the composite fiber to achieve certain desired properties.

The polymer components for the aforesaid purposes, (e.g., the formation of composite articles with the melt blend of the polyamide, polyester, and the lactam terpolymer) are often chosen on an economic basis in addition to the technical reasons, such as the improvement of the balance of physical properties. The composite fibers of the invention are useful in the production of non-woven fabrics. For these composite fibers thermal bonding of a randomly deposited web of fibers at temperatures from 100° to 250° C. results in useful non-woven fabrics.

The general method for producing the composite articles comprises forming a melt stream of a blend of the three component melt system of a polyamide, a polyester and a lactam terpolymer, and also forming a melt stream of another polymeric substance, specifically polyethylene terephthalate or nylon 66, and extruding the said two melt streams together in the configuration for example as a sheath core, a side by side composite fiber or other shaped article. The said composite product has at least 5% by weight of the said blend in the total composite article. Preferred embodiments of the invention are sheath core fibers for example with the blend of the polyamide, the polyester, and the lactam terpolymer as the sheath, and with the other polymeric substance, preferably polyethylene terephthalate or nylon 66 as the core of the sheath core fiber. Another preferred embodiment is a side by side composite fiber with the aforesaid components as the two side by side members.

Another embodiment of the invention is the use of the composite article such as sheath core or side by side composite fibers as used in the production of non-woven fabrics. For this purpose the fibers are produced as described above and are then assembled such as by random deposition on a moving belt to form a web. The web is then heat pressed at a temperature from 100° C. to 250° C.

What is claimed is:

1. A method for producing compatible melt blended fibers including a polyester and a polyamide which method comprises adding to the polyester and the polyamide, a terpolymer of lactam-polyol-polyacyl lactam or lactam-polyolacyl polylactam, in which three-component polymeric system each component is present at from 5 to 90% by weight, the process comprising melt spinning the said three component melt blend.

2. A method for producing compatible melt blended shaped articles including a polyester and a polyamide which method comprises adding to the polyester and the polyamide, a terpolymer of lactam-polyol-polyacyl lactam or lactam-polyolacyl polylactam, in which three-component polymeric system each component is present at from 5 to 90% by weight, the process comprising melting the said three component melt blend and forming the same into objects.

3. The product of claim 1.

4. The product of claim 2.

5. As a composition of matter a compatible three component polymeric melt blend comprising a polyamide, a polyester and a terpolymer of lactam-polyol-polyacyl lactam or lactam-polyolacyl polylactam, in which three component polymeric melt blend each component is present at from 5 to 90% by weight.

6. The composition as in claim 5 in which the polyamide is nylon 66.

7. The composition as in claim 5 in which the polyester is polyethylene terephthalate.

8. The method of making a nonwoven fabric of a melt blended polymeric composition including a polyester, a polyamide and a terpolymer of lactam-polyol-polyacyl lactam or lactam-polyol-acyl polylactam, in which three-component polymeric system each component is present at from 5% to 90% by weight, which method comprises melt-spinning the said three-component polymeric system into fibers, forming the said fibers into a web and bonding the said web into a nonwoven fabric.

9. The product of claim 8.

10. A method of producing a composite article which comprises forming a melt stream of a blend of a polyamide, a polyester, and a lactam terpolymer, and also forming a melt stream of another polymeric substance, and extruding the said two melt streams together in a composite configuration, the said composite configuration having at least 5% by wt. of the said blend in the total composite article.

11. The product of claim 10.

* * * * *